(12) United States Patent
Sivaprakasam (10) Patent No.: US 8,934,420 B2
(45) Date of Patent: Jan. 13, 2015

(54) MULTIPLE WIRED CLIENT SUPPORT ON A WIRELESS WORKGROUP BRIDGE

(75) Inventor: Sidhananda K. Sivaprakasam, Chennai (IN)

(73) Assignee: Cisco Technology, Inc., San Jose, CA (US)

(*) Notice: Subject to any disclaimer, the term of this patent is extended or adjusted under 35 U.S.C. 154(b) by 607 days.

(21) Appl. No.: 12/902,545

(22) Filed: Oct. 12, 2010

(65) Prior Publication Data

US 2012/0087315 A1 Apr. 12, 2012

(51) Int. Cl.
| | |
|---|---|
| H04W 4/00 | (2009.01) |
| H04W 8/26 | (2009.01) |
| H04L 29/12 | (2006.01) |
| H04W 88/04 | (2009.01) |
| H04W 84/12 | (2009.01) |
| H04W 88/08 | (2009.01) |

(52) U.S. Cl.
CPC ............ *H04W 8/26* (2013.01); *H04L 61/6022* (2013.01); *H04W 88/04* (2013.01); *H04W 84/12* (2013.01); *H04W 88/08* (2013.01)
USPC .......................................... 370/329; 370/341

(58) Field of Classification Search
None
See application file for complete search history.

(56) References Cited

U.S. PATENT DOCUMENTS

| | | | |
|---|---|---|---|
| 7,069,436 B1 * | 6/2006 | Akachi ........................ 713/162 |
| 7,529,256 B2 | 5/2009 | Pathan | |
| 7,567,537 B1 | 7/2009 | Gurbuz et al. | |
| 2003/0145092 A1 * | 7/2003 | Funato et al. ................. 709/229 |
| 2004/0028072 A1 * | 2/2004 | Moutarlier .................... 370/448 |
| 2004/0103282 A1 * | 5/2004 | Meier et al. ................... 713/171 |
| 2007/0030823 A1 * | 2/2007 | Guo et al. ..................... 370/328 |
| 2007/0058560 A1 * | 3/2007 | Sakai ............................ 370/252 |
| 2008/0008182 A1 * | 1/2008 | Deng ............................ 370/392 |
| 2008/0028089 A1 * | 1/2008 | Izoslav et al. ................. 709/230 |

OTHER PUBLICATIONS

Cisco—Cisco Aironet 350 Series Workgroup Bridge Data Sheet, Copyright 1992-2006 Cisco Systems, Inc., pp. 1-6.
Cisco IOS Software Release 12.4(3G)JA, Product Bulletin,Copyright 1992-2007 Cisco Systems, Inc., pp. 1-6.
Release Notes for Cisco 3200 Series Router, First Released Aug. 22, 2008, pp. 1-6, Americas Headquarters, San Jose, CA.

* cited by examiner

*Primary Examiner* — Derrick Ferris
*Assistant Examiner* — Kodzovi Acolatse
(74) *Attorney, Agent, or Firm* — Edell, Shapiro & Finnan, LLC (57) ABSTRACT

A method is provided to receive and transmit network frames across a network. A wireless access point device is configured operate as a wireless bridge (e.g., wireless workgroup bridge) to reserve a predetermined number of bits of a media access control (MAC) address of the wireless access point device. Combinations of the predetermined number of bits can be assigned by the wireless access point device to respective ones of a plurality of wired clients of the wireless access point device. The wireless access point device can store data that maps the combinations of the predetermined number of bits of the mapped MAC addressees. The access point device can then process downstream network frames received wirelessly from a root wireless access point and can process upstream network frames received from the plurality of wired clients.

20 Claims, 8 Drawing Sheets

| Mapped WGB MAC Address | Wired Client |
|---|---|
| 0001............1 | Client 1 with MAC address ..... |
| 0010............1 | Client 2 with MAC address .... |
| 0011............1 . . . | Client 3 with MAC address .... |
| 1111 | Client 15 with MAC address..... |

0000....... Mapped to the WGB management MAC address
/
302

MULTIPLE WIRED CLIENT SUPPORT ON A WIRELESS WORKGROUP BRIDGE

TECHNICAL FIELD

The present invention generally relates to a wireless access point, such as a wireless workgroup bridge, that is configured to receive and transmit network frames on behalf of wired network clients.

BACKGROUND

Certain wireless access points used in wireless local area networks can be configured to operate as a wireless workgroup bridge, whereby it can provide wireless uplink for wired clients to a root wireless network access point device. The Inter-Access Point Protocol (IAPP) allows wireless network access points to communicate with each other to establish configurations including wired clients details when a wireless network access point is configured as a wireless workgroup bridge. Thus, root access points can learn and identify the wired clients behind the wireless workgroup bridge and can add wired clients in an association table through IAPP. However, some wireless network access points do not support IAPP and thus they cannot readily support the interaction with the wireless workgroup bridge to serve the wireless client devices behind the wireless workgroup bridge. For example, some wireless network access point devices treat a wireless workgroup bridge as a client and use only three addresses (ultimate source, ultimate destination and basic service set identifier). Thus, when a wireless workgroup bridge connects to a root wireless network access point device that does not support IAPP, a mechanism is needed to enable wired client support.

DETAILED DESCRIPTION

Overview

A wireless access point device is configured to operate as a wireless workgroup bridge (also referred to herein as a "WGB") between a plurality of wired clients and a root wireless access point device in a wireless local area network. The wireless workgroup bridge is configured to reserve a predetermined number of bits of its wireless media access control (MAC) address for communication with each of a plurality of wired clients. The wireless workgroup bridge assigns combinations of values of the predetermined number of bits to respective ones of the plurality of wired clients. The wireless workgroup bridge stores the information that assigns the combinations of values of the predetermined number of bits to respective ones of the plurality of wired clients. The wireless workgroup bridge processes downstream frames wirelessly received from the root wireless access point to forward the frames to the appropriate wired client based on values of the predetermined number of bits in the MAC address of the frame. The wireless workgroup bridge also processes upstream frames received from the plurality of wired clients to be wirelessly forwarded to the root wireless access point using the predetermined number of bits of the MAC address.

Example Embodiments

Figure 1:
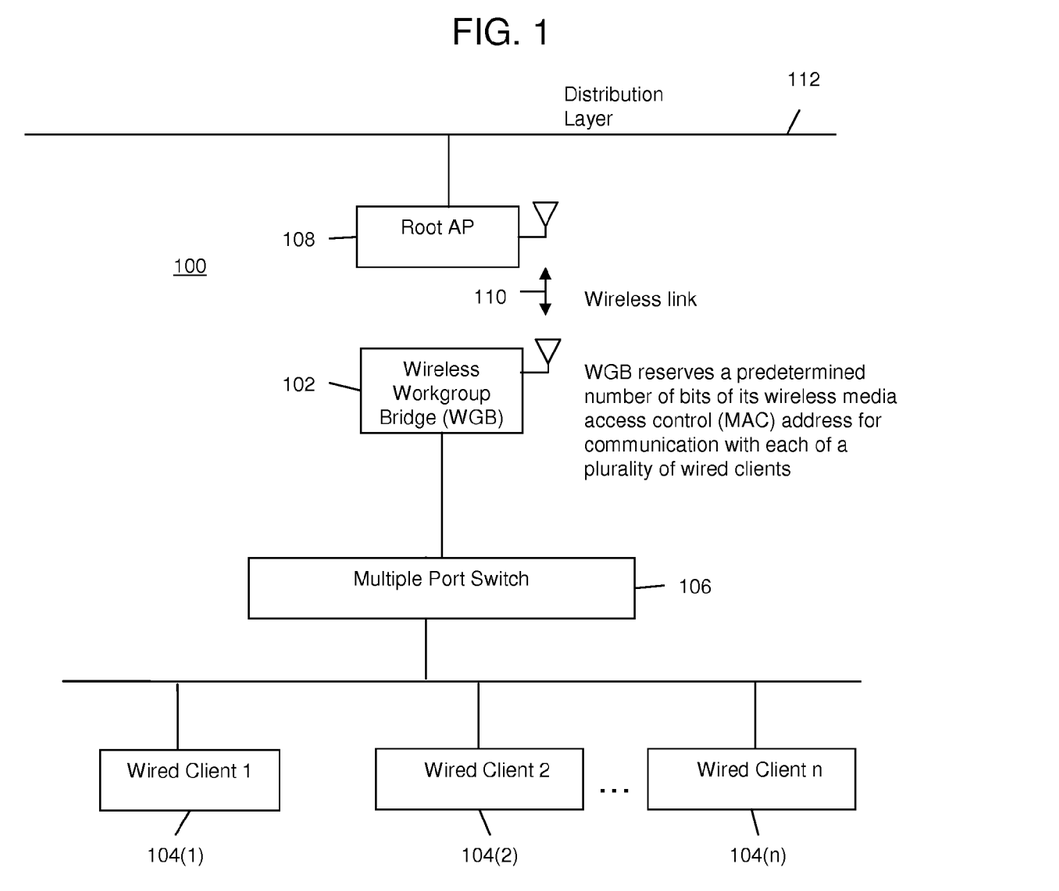
FIG. 1 is a block diagram showing an example of a network topology including a wireless access point (AP) configured to operate as a wireless workgroup bridge and to store data mapping its media access control (MAC) address to a plurality of wired clients.

Referring to FIG. 1, an example topology for a network is shown at 100. The network 100 comprises a wireless access point (AP) device 102 that is configured to operate as a wireless workgroup bridge (WGB) between a plurality of wired clients 104(1)-104(n) and a root wireless AP device 108. For convenience, the wireless workgroup bridge 102 may be referred to hereinafter as simply a wireless bridge in a wireless local area network (WLAN). The root AP 108 is a type that does not support IAPP. For example, wireless bridge 102 and root AP 108 are APs that are designed to operate in accordance with an IEEE 802.11 WLAN communication standard. An 802.11 AP is shipped with a default configuration to operate as a root AP but it may also, through a suitable user interface, be configured to change its operation mode to operate as a WGB. Thus, the link between the WGB 102 and the root AP 108 is a wireless link shown at reference numeral 110.

Root AP 108 is connected to a distribution layer 112. Network frames and packets are transmitted in network 100 between distribution layer 112 and the wired clients 104(1)-104(n) according to the techniques described herein. The WGB 102 receives downstream wireless network frames and packets from the root AP 108 based on transmitted frames that originate from distribution layer 112. WGB 102 processes the received wireless network frames to generate wired network frames and forwards the generated wired network frames to a destination wired client among the plurality of wired clients 104(1)-104(n) via multiple port switch 106 according to the techniques described herein. The term "downstream" is meant to refer to the direction of frames from the root AP 108 (sourced by a device in the distribution layer 112) to a wired client via the WGB 102.

In addition, WGB 102 receives upstream wired network frames and packets from one of the wired clients 104(1)-104(n), via multiple port switch 106, intended for a destination device in the distribution layer 112. The WGB 102 processes the received wired network frames to generate wireless network frames and wirelessly forwards the generated wireless network frames to the root AP 108, which in turn, sends them to the distribution layer 112. The term "upstream" is meant to refer to the direction of frames from a wired client to the root AP 108 via the WGB 102 and ultimately to a device in the distribution layer 112.

A "Universal WGB" (UWGB) mode may be introduced to allow a WGB to associate with any vendor's root APs. In general, a WGB can interoperate with its same vendor root AP and thus can provide the wired clients support using internal implementations, for example, through an Inter Access Point Protocol (IAPP). In one embodiment, a UWGB uses the MAC address of the wired client as its own MAC address and for its association with a root AP. The root AP will send wireless network frames to this MAC address, and the WGB receives and forwards the network frames to the wired client. In this way, a UWGB can only support one wired client. The UWGB mode of a wireless network AP may be configured to support one wired client as discussed above or multiple wired clients with, for example, Layer 3 Network Address Translation (NAT) or Port Address Translation (PAT) support. To support multiple wired clients, Layer 3 NAT or PAT translation may necessarily be supported by both wireless root Access Points and the UWGB. However, the techniques disclosed herein enable the UWGB mode of a wireless network AP to support multiple wired clients behind the UWGB using Layer 2 networking operations, without necessarily requiring Layer 3 NAT or PAT translation.

Figure 2:
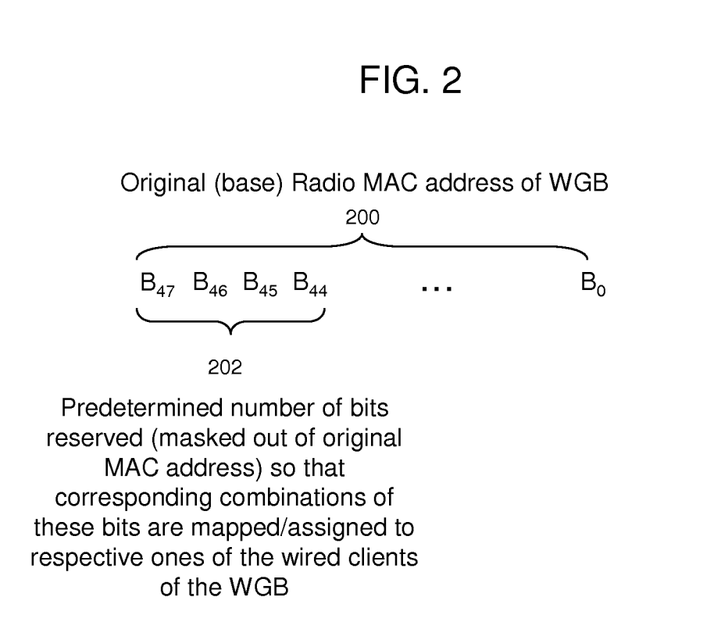
FIG. 2 is an example of a bit sequence representing a MAC address of the wireless workgroup bridge with a predetermined number of bits of the MAC address allocated to map to each of a plurality of wired clients of the wireless workgroup bridge.

Turning to FIG. 2, an example of a bit sequence is shown that represents the MAC address 200 of the WGB 102 used for wireless communication with the root AP 108. In other words, the MAC address 200 depicted in FIG. 2 is a wireless or radio MAC address for the WGB 102. The root AP 108 uses the MAC address 200 as the destination address when sending wireless frames to the WGB 102. Likewise, the WGB 102 uses the MAC address 200 as the source address when sending wireless frames to the root AP 108. As shown in FIG. 2, the MAC address 200 comprises, for example, a 48-bit sequence represented by $B_{47}$ to $B_0$, though it should be appreciated that any predetermined number of bits may be used for the MAC address 200. For example, the IEEE 802.11 communication standard calls for a 48-bit MAC address. A predetermined number of bits of MAC address 200 are reserved and combinations of these bits are mapped/assigned to respective ones of the wired clients 104(1)-104(n). The remaining bits in the bit sequence are used to represent the MAC address of WGB 102. For example, as shown at reference numeral 202, four bits $\{B_{47}, B_{46}, B_{45}, B_{44}\}$ of the 48 bit sequence are reserved to map to as many as 16 ($2^4$) wired clients using combinations thereof to map to the wired clients. Data is stored at WGB 102 for the combinations of the reserved bits in order to process network frames to and from the wired clients 104(1)-104(n) in accordance with the techniques described herein. In other words, multiple wired (Ethernet) clients can be served by masking the 48-bit radio MAC address to a 44-bit mask value. The last nibble (4-bits) of the radio MAC address can be used to derive a total of 16 MAC addresses.

Figure 3:
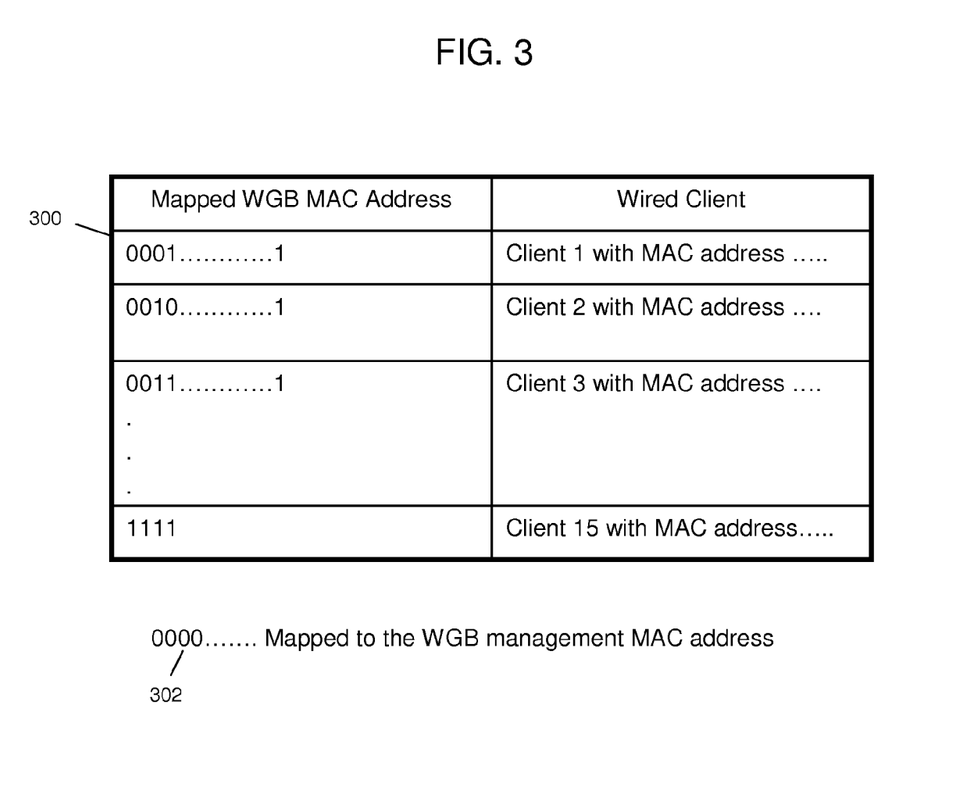
FIG. 3 is an example of a table of data showing combinations of the predetermined number of bits of the MAC address of the wireless workgroup bridge assigned to respective ones of the plurality of wired clients.

Turning to FIG. 3, a table 300 of mapped combinations of values of the reserved bits of the MAC address for WGB 102 is shown. Table 300 shows combinations of values of the four reserved bits that are mapped/assigned to each of the wired clients 104(1)-104(n). For example, the MAC address of WGB 102 with the reserved four bit combination of values "0001" is mapped or assigned to wired client number 1, the four bit combination of values "0010" is mapped to wired client 2, and so on. This mapping scheme is meant by way of example only. Thus, data is stored in the WGB that maps combinations of values of bits (forming a subset) of the wireless MAC address of the WGB 102 to a MAC address or other identifier of a corresponding one of the plurality of wired clients 104(1)-104(n). One of the four bit combinations, shown at reference numeral 302, is reserved for a management MAC address for the WGB 102. Data representing the assignments depicted by table 300 is stored in a memory of WGB 102 in order to process and transmit network frames and packets to and from the wired clients in accordance with the techniques described herein. The WGB 102 uses this data to determine the particular wired client that is associated with a corresponding reserved bit pattern of the wireless MAC address of the WGB. The number of reserved bits in the MAC address determines the number of wired clients that the WGB 102 can serve. Four bits is only an example and more wired clients can be served according to the techniques described herein if a greater number of bits of the MAC address are reserved.

Figure 4:
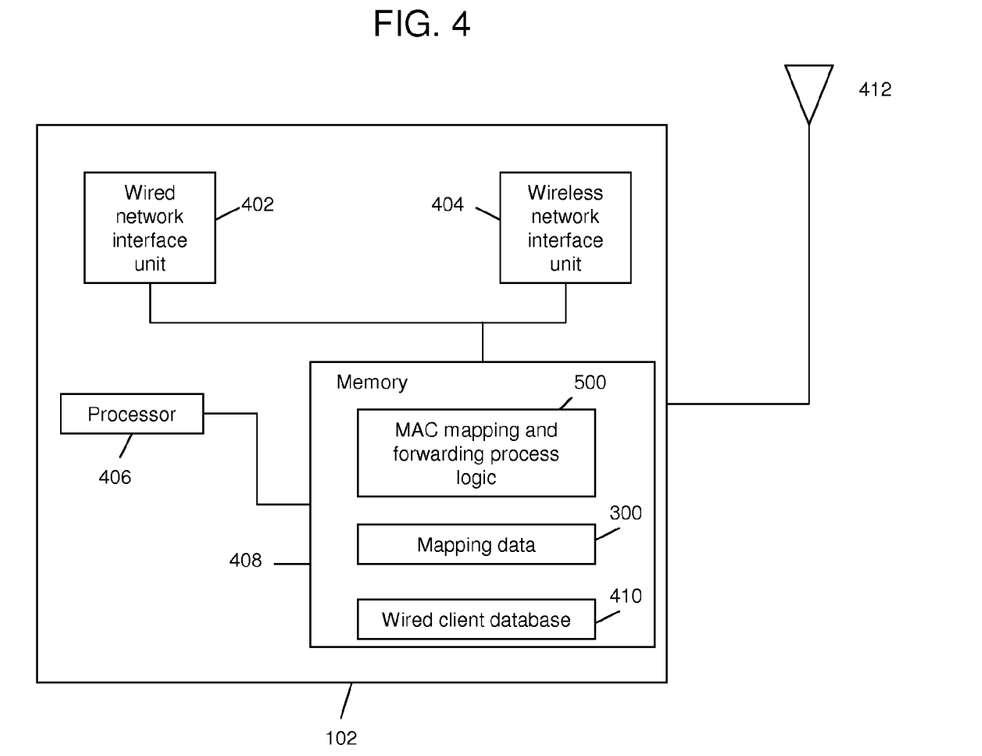
FIG. 4 is an example of a block diagram of a wireless AP device configured to operate as a wireless workgroup bridge and to serve multiple wired clients using the MAC address mapping technique depicted in FIGS. 2 and 3.

Turning to FIG. 4, a block diagram of a wireless AP configured to operate as WGB 102 is now described. The WGB 102 comprises a wired network interface unit 402, a wireless network interface unit 404, a controller or processor 406, and a memory 408. Memory 408 stores mapping data 300 (described above in connection with FIG. 3), a wired client database 410, and instructions for MAC mapping and forwarding process logic 500. Wired network interface unit 402 is configured to perform wired network communications between WGB 102 and the plurality of wired clients 104(1)-104(n) via multiple port switch 106. The WGB 102 receives network frames (packets) from one or more of the wired clients 104(1)-104(n) via multiple port switch 106 to be processed by processor 406 in accordance with MAC mapping and forwarding process logic 500. Similarly, wireless network interface unit 404 is configured to perform wireless network communications between WGB 102 and the root AP 108, for example, according to the rules of the IEEE 802.11 communication standard. The WGB 102 receives a plurality of wireless network frames from root AP 108 to be processed by processor 406 in accordance with MAC mapping and forwarding process logic 500.

Processor 406 is configured to execute instructions stored in memory 408 for carrying out the various techniques described herein, including the MAC mapping and forwarding process logic 500 stored in memory 408. Generally, MAC mapping and forwarding process logic 500 is configured to reserve a predetermined number of bits of a MAC address of WGB 102, store data that assigns the combinations of the predetermined number of bits to respective ones of the plurality of wired clients 104(1)-104(n), process network frames that are wirelessly received at the WGB 102 from root AP 108 destined for a corresponding one of the plurality of wired clients 104(1)-104(n) and process network frames received from one of the plurality of wired clients 104(1)-104(n) to be wirelessly forwarded to the root AP 108.

The operations of processor 406 may be implemented by instructions encoded in one or more tangible (non-transitory) memory media (e.g., embedded logic such as an application specific integrated circuit, digital signal processor instructions, software that is executed by a processor, etc), wherein memory 408 stores data used for operations described herein and stores software or processor executable instructions that are executed to carry out the operations described herein. The MAC mapping and forwarding process logic 500 may take any of a variety of forms, so as to be encoded in one or more tangible (non-transitory) memory media for execution, such as fixed logic or programmable logic (e.g., software/computer instructions executed by a processor) and the processor 406 may be an ASIC that comprises fixed digital logic, or a combination thereof. For example, the processor 406 may be embodied by digital logic gates in a fixed or programmable digital logic integrated circuit, which digital logic gates are configured to perform the operations for the MAC mapping and forwarding process logic 500. In one form, the MAC mapping and forwarding process logic 500 may be embodied in a tangible (non-transitory) processor or computer-readable memory medium (memory 406) that is encoded with instructions for execution by a processor (e.g. processor 406) that, when executed by the processor, are operable to cause the processor to perform the operations described herein in connection with the MAC mapping and forwarding process logic 500.

The WGB 102 also comprises an antenna (or array of antennas) shown at reference numeral 412 for transmitting wireless signals to the root AP 108 and receiving wireless signals from the root AP 108.

As described above in connection with FIG. 1, WGB 102 receives upstream wired network frames from a corresponding one of the plurality of wired clients 104(1)-104(n) destined for a device in the distribution layer 112 and forwards them to the root AP 108. In addition, the WGB 102 receives downstream wireless network frames from root AP 108, sent from a device in the distribution layer 112 and destined for one of the plurality of wired clients 104(1)-104(n), and forwards the network frames to the appropriate one of the plurality of wired clients 104(1)-104(n). The wired client database 410 is used for encryption key management for the plurality of wired clients 104(1)-104(n), as described hereinafter.

Figure 5:
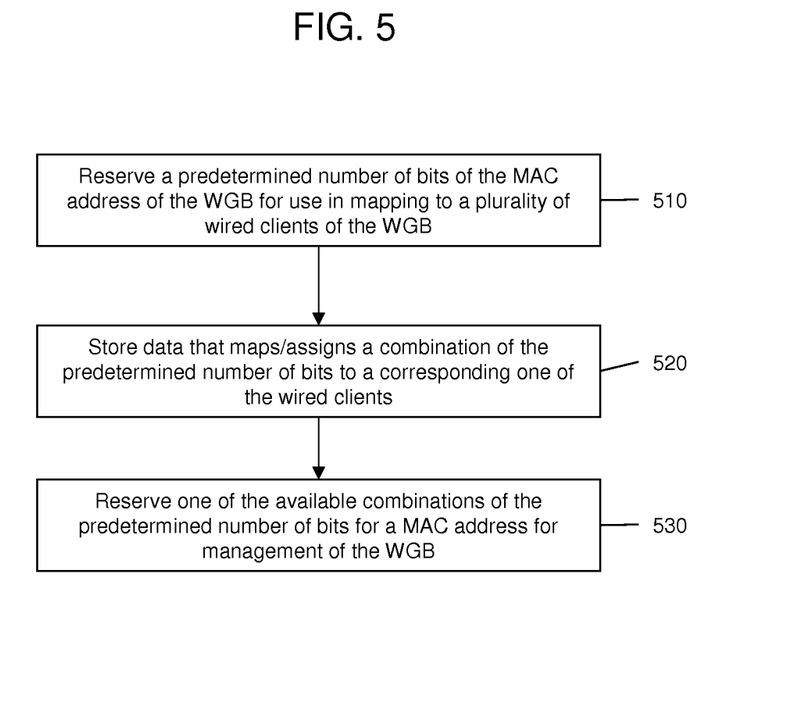
FIG. 5 is an example of a flow chart illustrating how the wireless workgroup bridge assigns combinations of the predetermined number of bits of its MAC address to the plurality of wired clients.

Turning to FIG. 5, an example of a flow chart for the MAC address mapping operations of the MAC mapping and forwarding process logic 500 is now described. At 510, processor 406 reserves a predetermined number of bits of the MAC address of the WGB such that combinations of the predetermined number of bits of the MAC address are available to be assigned to each of the plurality of wired clients 104(1)-104(n). For example, processor 406 may reserve four bits of a 48-bit MAC address of the WGB 102 such that combinations of the reserved four bits are available to be assigned to up to 16 wired clients. The combination of the predetermined number of bits of the WGB MAC address forms a unique WGB MAC address used by the WGB for a corresponding wired client. At 520, processor 406 stores data that maps or assigns a combination of values of the predetermined number of bits to a corresponding one of the wired clients 104(1)-104(n). At 530, processor 406 reserves one of the available combinations of values of the predetermined number of bits for management for a unique MAC address for managing and configuring the WGB 102.

Figure 6:
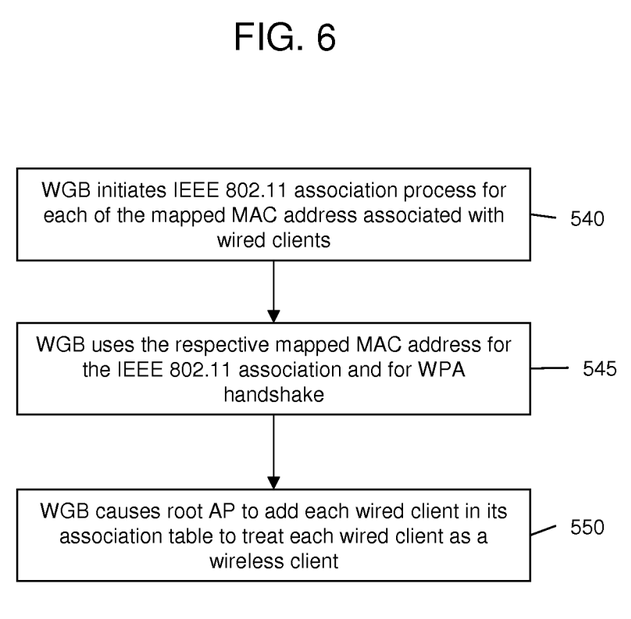
FIG. 6 is an example of a flow chart illustrating how the wireless workgroup bridge allows the plurality of wireless clients to associate with a root AP.

Turning to FIG. 6, an example of a flow chart for the association operations of the MAC mapping and forwarding process logic 500 is now described. The WGB makes n+1 number of IEEE 802.11 associations with the root AP 108 on behalf of the n wired clients and the WGB 102 makes one 802.11 association for itself with the root AP 108. For example, at 540, processor 406 of WGB 102 initiates an IEEE 802.11 association process for each of the assigned MAC addresses for each of the plurality of wired clients 104(1)-104(n). At 545, processor 406 uses the mapped MAC address of the WGB 102 for the IEEE 802.11 association process to synchronize the mapped MAC addresses of the WGB 102 with the root AP 108. Also at 545, the processor 406 initiates an encryption authorization handshake, e.g., a Wi-Fi™ Protected Access (WPA) v1/v2 handshake, between WGB 102 and root AP 108 to establish a secure association between WGB 102 and root AP 108 on behalf of each wired client. At 550, as a result of the WPA handshake between WGB 102 and root AP 108, root AP 108 is caused to add each of the plurality of wired clients 104(1)-104(n) represented by their respective assigned MAC address to an association table in the root AP so that root AP 108 considers/treats each of the plurality of wired clients 104(1)-104(n) as wireless clients of root AP 108.

Figure 7:
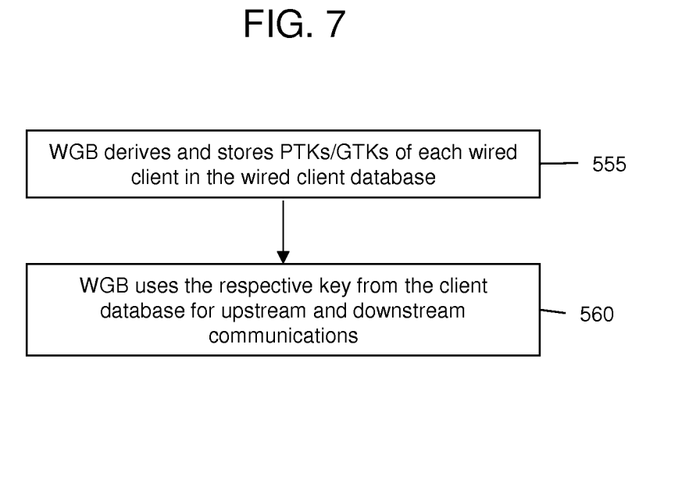
FIG. 7 is an example of a flow chart showing a key management process for the plurality of wired clients.

Turing to FIG. 7, an example of a flow chart for the key management operations of the MAC mapping and forwarding process logic 500 is now described. The WGB 102 uses its security credentials to obtain appropriate encryption keys and installs the keys in its wireless network interface unit 404. To do this, the WGB 102 uses its base MAC address when deriving the keys and thereafter it can then initiate the association process for its wired clients using the MAC addresses with the unique combinations of the predetermined number of bits assigned to the respective wired clients. At 555, processor 406 of wireless AP 102 derives at least one of a Pairwise Transient Key (PTK) or a group temporal key (GTK) for each of the plurality of wired clients 104(1)-104(n) represented by each mapped MAC address and stores the PTK or GTK for each of the plurality of wired clients 104(1)-104(n) in the wired client database 410. The PTK is guaranteed to be unique for the same credentials across all the associations as long as there is not a strict username/password-to-MAC address mapping on the Authorization, Authentication and Accounting (AAA) server. As shown at 560, the PTKs or GTKs for each of the plurality of wired clients 104(1)-104(n) are used to authenticate each of the plurality of wired clients 104(1)-104(n) during upstream and downstream transmission of network frames. The PTKs are used for a secure session between the root AP and the WGB 102 on behalf of a single wired client whereas the GTKs are used to broadcast/multicast frames to multiple wired clients. In one example, the same GTK may be sent to the WGB 102 for each association that is established. In another example, frames may be broadcast to specific multicast groups, and, as a result, different GTKs may be sent to the WGB that correspond to different clients. In any case, the WGB may store each of the GTK and PTK that correspond with each of the wired clients.

Figure 8:
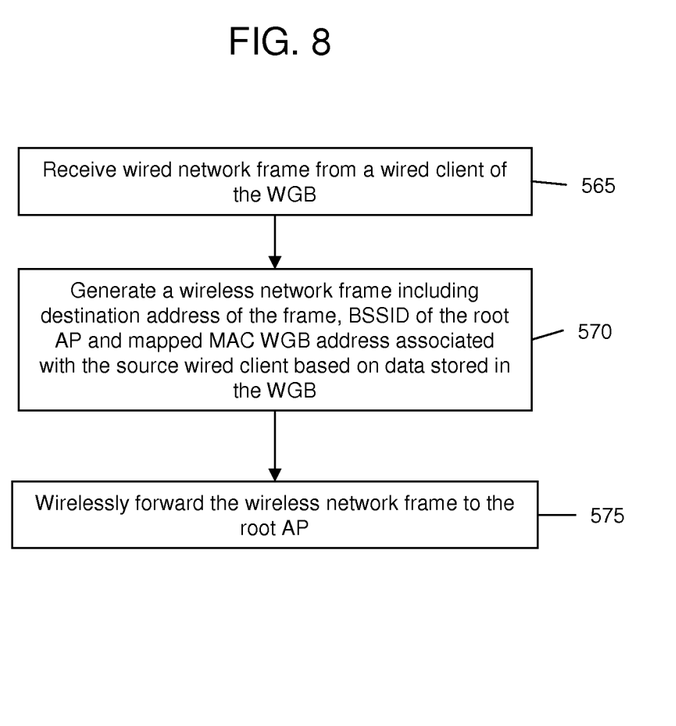
FIG. 8 is an example of a flow chart illustrating how the wireless workgroup bridge forwards wired network frames received from a wired client over a wireless link to the root AP.

Turning to FIG. 8, an example of a flow chart for the upstream forwarding operations of the MAC mapping and forwarding process logic 500 is now described. At 565, the WGB 102 receives a wired network frame, via the wired network interface unit 402, from a particular one or more of the plurality of wired clients 104(1)-104(n). In response to receiving the wired network frame, at 570, processor 406 generates a wireless frame from the wired network frame. The wireless network frame comprises a MAC address of WGB 102 with the combination of the predetermined bits that have been mapped and assigned to the particular wired client. The wireless network frame also comprises a destination address of the device at the distribution layer 112 that is the intended destination of the wireless network frame as well as a basic service set identifier (BSSID) of root AP 108. At 575, processor 406 wirelessly forwards, via the wireless network interface unit 404, the wireless network frame to root AP 108.

Figure 9:
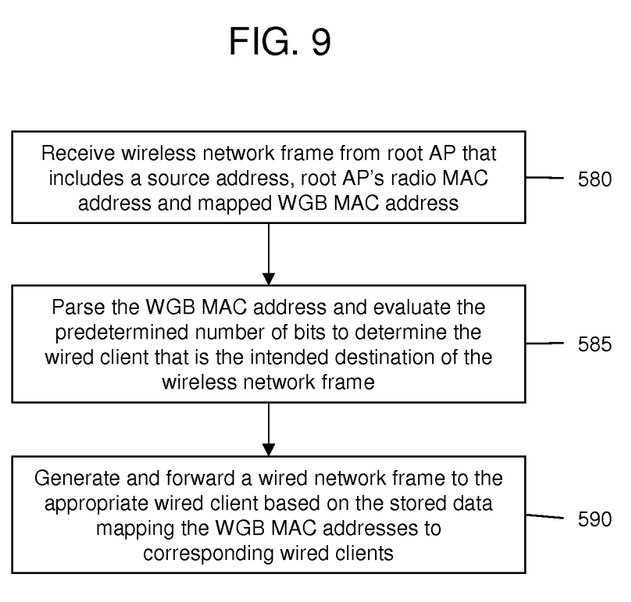
FIG. 9 is an example of a flow chart illustrating how the wireless workgroup bridge forwards wireless network frames received from the root AP to a respective and one of the plurality of wired clients.

Turning to FIG. 9, an example flow chart for the downstream forwarding operations of the MAC mapping and forwarding process logic 500 is now described. At 580, the WGB 102 receives a wireless network frame, via the wireless network interface unit 404, from root AP 108. The wireless network frame comprises source address indicating the origin or source device in the distribution layer 112 of the wireless network frame, a MAC address assigned to WGB 102, and a MAC address of the root AP 108. The root AP will use a particular MAC address (with the appropriate bit combination of the reserved bits of the WGB's MAC address) depending on the destination wired client device for frame. After receiving the wireless network frame, the processor at 585, parses the MAC address assigned to WGB 102 and evaluates or examines the predetermined number of bits of the MAC address that are reserved for identifying one of the wired clients against the stored data (e.g., mapping tble 300) to determine the particular one of the plurality of wired clients 104(1)-104(n) for which the wireless network frame is destined. At 590, processor 406 generates a wired network frame addressed to the particular wired client from the received wireless network frame and forwards the wired network frame to the particular client. For example, processor 406 generates the wired network frame based on the stored data that maps the WGB 102 MAC addresses to corresponding wired clients 104(1)-104(n) and forwards the wired network frame, via the wired network interface unit 402, to the appropriate wired client.

The WGB 102 forwards any multicast packet received from the root AP 108 to all of its wired clients that are part of the multicast group address of the multicast packet. Moreover, the WGB 102 will forward any address resolution request messages to all wired clients in the downstream direction and also will forward such address resolution request messages to the root AP 108 in the upstream direction.

In sum, an apparatus is provided comprising a wired network interface unit configured to enable wired network communications, a wireless network interface unit configured to enable wireless communications on a wireless local area network and a processor configured to be coupled to the wired network interface unit and the wireless network interface unit. The processor is configured to: reserve a predetermined number of bits of a MAC address used for communications on the wireless local area network such that combinations of the predetermined number of bits of the MAC address are available to be assigned to respective ones of a plurality of wired clients, store data that assigns combinations of values of the predetermined number of bits of the MAC address to corresponding ones of the plurality of wired clients, process downstream frames wirelessly received from a root wireless access point device to be forwarded to a corresponding one of the wired clients and process upstream frames received from a wired client for wireless transmission/forwarding to the root wireless AP device.

Additionally, a tangible computer-readable medium is provided that stores instructions that, when executed by a processor, cause the processor to: reserve a predetermined number of bits of a media access control (MAC) address of a wireless access point device configured to operate as a wireless workgroup bridge between a plurality of wired clients and a root wireless access point device such that combinations of values of the predetermined number of bits of the MAC address are available to be assigned to respective ones of the plurality of wired clients, store data that assigns combinations of values of the predetermined number of bits of the MAC address to corresponding ones of the plurality of wired clients, process downstream frames wirelessly received from the root wireless access point device to be forwarded to a corresponding one of the wired clients and process upstream frames received from the wired clients for wireless transmission/forwarding to the root wireless access point device.

The above description is intended by way of example only. Various modifications and structural changes may be made therein without departing from the scope of the concepts described herein and within the scope and range of equivalents of the claims.

What is claimed is:

1. A method comprising:
    at a wireless access point device configured to operate as a wireless bridge between a plurality of wired clients and a root wireless access point device, reserving a predetermined number of bits corresponding to most significant bits of a media access control (MAC) address of the wireless access point device, wherein combinations of the predetermined number of bits of the MAC address are available to be assigned to respective ones of the plurality of wired clients, and wherein remaining bits other than the predetermined number of bits identify the wireless access point device;
    at the wireless access point device, storing data that assigns combinations of the predetermined number of bits of the MAC address to corresponding ones of the plurality of wired clients; and
    at the wireless access point device, processing downstream frames wirelessly received from the root wireless access point device to forward them to an appropriate one of the wired clients by evaluating the predetermined number of bits of the MAC address of a wireless network frame that is reserved for identifying one of the plurality of wired clients to determine the one of the plurality of wired clients for which the wireless network frame is destined and processing upstream frames received from one of the wired clients for wireless transmission to the root wireless access point device.

2. The method of claim 1, wherein reserving comprises reserving one combination of the predetermined number of bits for management of the wireless access point device.

3. The method of claim 1, wherein processing upstream frames comprises:
    receiving a wired network frame from a particular wired client;
    generating a wireless network frame from the wired network frame, the wireless network frame comprising a MAC address of the wireless access point device with a corresponding combination of values for the predetermined number of bits assigned to the particular wired client; and
    wirelessly forwarding the wireless network frame to the root wireless access point device.

4. The method of claim 3, wherein generating comprises generating the wireless network frame that comprises a destination address of the device that is the intended destination of the wireless network frame, the MAC address of the wireless access point device with the corresponding combination of values for the predetermined number of bits assigned to the particular wired client and a basic service set identifier of the root wireless access point device.

5. The method of claim 1, wherein processing downstream frames comprises:
    parsing the MAC address of a wireless network frame received from the root wireless access point device and evaluating the predetermined number of bits of the MAC address against the stored data to determine a particular wired client for which the wireless network frame is destined;
    generating a wired network frame addressed to the particular wired client from the wireless network frame; and
    forwarding the wired network frame to the particular wired client.

6. The method of claim 1, further comprising:
initiating an association process for each of the assigned MAC addresses for each of the wired clients so that each wired client is added to an associated table of the root wireless access point device; and
initiating an encryption handshake between the wireless access point device and the root wireless access point device for each of the wired clients.

7. The method of claim 1, further comprising deriving at least one encryption key for each of the plurality of wired clients represented by the MAC address of the wireless access point device.

8. The method of claim 1, wherein reserving comprises reserving the predetermined number of bits of a 48-bit MAC address of the wireless access point device.

9. A non-transitory computer-readable medium that stores instructions that, when executed by a processor, cause the processor to:
at a wireless access point device configured to operate as a wireless bridge between a plurality of wired clients and a root wireless access point device in a wireless local area network, reserve a predetermined number of bits corresponding to most significant bits of a media access control (MAC) address of the wireless access point device, wherein combinations of the predetermined number of bits of the MAC address are available to be assigned to respective ones of the plurality of wired clients, and wherein remaining bits other than the predetermined number of bits identify the wireless access point device;
store data that assigns combinations of the predetermined number of bits of the MAC address to corresponding ones of the plurality of wired clients; and
process downstream frames wirelessly received from the root wireless access point device to forward them to an appropriate one of the wired clients by evaluating the predetermined number of bits of the MAC address of a wireless network frame that is reserved for identifying one of the plurality of wired clients to determine the one of the plurality of wired clients for which the wireless network frame is destined and process upstream frames received from one of the wired clients for wireless transmission to the root wireless access point device.

10. The computer-readable medium of claim 9, wherein the instructions that cause the processor to reserve the predetermined number of bits comprise instructions that cause the processor to reserve one combination of the predetermined number of bits for management of the wireless access point device.

11. The computer-readable medium of claim 9, wherein the instructions that cause the processor to process upstream frames comprise instructions that cause the processor to generate a wireless network frame from a wired network frame received from a particular wired client, the wireless network frame comprising a MAC address of the wireless access point device with a corresponding combination of values for the predetermined number of bits assigned to the particular wired client, the wireless network frame to be wirelessly forwarded to the root wireless access point device.

12. The computer-readable medium of claim 11, wherein the instructions that cause the processor to generate the wireless network frame comprise instructions that cause the processor to generate the wireless network frame that comprises a destination address of the device that is the intended destination of the wireless network frame, the MAC address of the wireless access point device with a corresponding combination of values for the predetermined number of bits assigned to the particular wired client and a basic service set identifier of the root access point wireless access point device.

13. The computer-readable medium of claim 9, wherein the instructions that cause the processor to process downstream frames comprise instructions that cause the processor to:
parse the MAC address of a wireless network frame received from the root wireless access point device and evaluate the predetermined number of bits of the MAC address against the stored data to determine a particular wired client for which the wireless network frame is destined; and
generate a wired network frame addressed to the particular wired client from the wireless network frame to be forwarded to the particular wired client.

14. The computer-readable medium of claim 9, further comprising instructions that cause the processor to:
initiate an association process for each of the assigned MAC addresses associated with each of the wired clients so that each wired client is added to an associated table of the root wireless access point device; and
initiate an encryption handshake between the wireless access point device and the root wireless access point device for each of the wired clients.

15. The computer-readable medium of claim 9, further comprising instructions that cause the processor to derive at least one encryption key for each of the plurality of wired clients represented by the MAC address.

16. An apparatus comprising:
a wired network interface unit configured to enable wired network communications in a wired network;
a wireless network interface unit configured to enable wireless communications in a wireless local area network; and
a processor configured to be coupled to the wired network interface unit and the wireless network interface unit, the processor configured to:
reserve a predetermined number of bits corresponding to most significant bits of a media access control (MAC) address used for communications in the wireless local area network, wherein combinations of the predetermined number of bits of the MAC address are available to be assigned to respective ones of a plurality of wired clients, and wherein remaining bits other than the predetermined number of bits identify the wireless access point device;
store data that assigns combinations of the predetermined number of bits of the MAC address to corresponding ones of the plurality of wired clients; and
process downstream frames wirelessly received from a root wireless access point device to be forwarded to a corresponding one of the wired clients by evaluating the predetermined number of bits of the MAC address of a wireless network frame that is reserved for identifying one of the plurality of wired clients to determine the one of the plurality of wired clients for which the wireless network frame is destined and process upstream frames received from a wired client for wireless transmission to the root wireless access point device.

17. The apparatus of claim 16, wherein the processor is configured to process upstream streams by generating a wireless network frame from a wired network frame received from a particular wired client, the wireless network frame comprising a MAC address with a corresponding combination of values for the predetermined number of bits assigned to the particular wired client, the wireless network frame to be wirelessly forwarded by the wireless network interface unit to the root wireless access point device.

18. The apparatus of claim 17, wherein the processor is configured to generate the wireless network frame by generating the wireless network frame comprising a destination address of the device that is the intended destination of the wireless network frame, the MAC address with a corresponding combination of values for the predetermined number of bits assigned to the particular wired client and a basic service set identifier of the root access point wireless access point device.

19. The apparatus of claim 16, wherein the processor is configured to process downstream frames by parsing the MAC address of a wireless network frame received from the root wireless access point device and evaluating the predetermined number of bits of the MAC address against the stored data to determine a particular wired client for which the wireless network frame is destined, and generating a wired network frame addressed to the particular wired client from the wireless network frame, the wired network frame to be forwarded by the wired network interface unit to the particular wired client.

20. The apparatus of claim 16, wherein the processor is configured to:
   initiate an association process for each assigned MAC address associated with each of the wired clients so that each wired client is added to an associated table of the root wireless access point device; and
   initiate an encryption handshake between the wireless access point device and the root wireless access point device for each of the wired clients.

* * * * *